(No Model.)
L. P. STRAUBE.
LEMON JUICE EXTRACTOR.
No. 581,526. Patented Apr. 27, 1897.
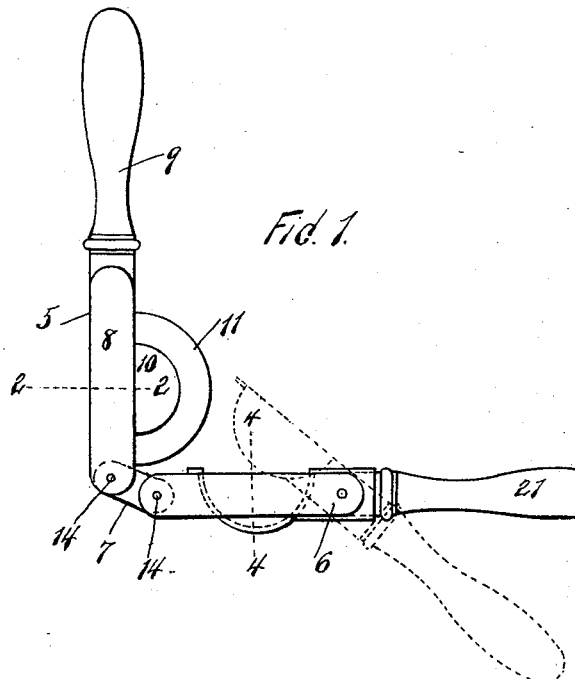
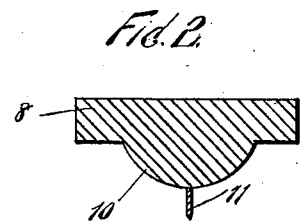
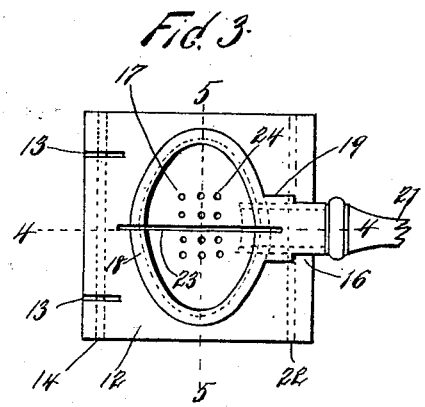
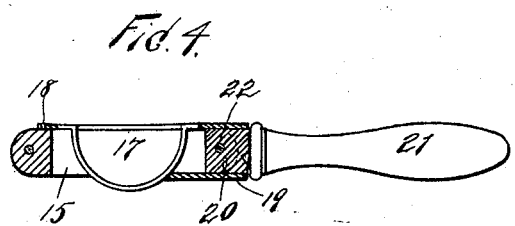
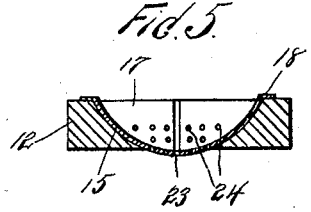
WITNESSES
INVENTOR
Leopold P. Straube
BY
Edgar Tate & Co
ATTORNEYS.

United States Patent Office.

LEOPOLD PHILIP STRAUBE, OF CHICAGO, ILLINOIS.

LEMON-JUICE EXTRACTOR.

SPECIFICATION forming part of Letters Patent No. 581,526, dated April 27, 1897.

Application filed January 7, 1897. Serial No. 618,238. (No model.)

*To all whom it may concern:*

Be it known that I, LEOPOLD PHILIP STRAUBE, a citizen of the United States, residing at Chicago, in the county of Cook and State of Illinois, have invented certain new and useful Improvements in Lemon-Juice Extractors, of which the following is a full and complete specification, such as will enable those skilled in the art to which it appertains to make and use the same.

This invention relates to devices for extracting the juice of lemons and other fruit; and the object thereof is to provide an improved device of this class which is simple in construction and operation and which is well adapted to accomplish the result for which it is intended, while being also comparatively inexpensive.

The invention is fully disclosed in the following specification, of which the accompanying drawings form a part, in which—

Figure 1 is a side view of my improved device and showing the method of the operation thereof; Fig. 2, a section of one part of my improved device, said section being taken on the line 2 2 of Fig. 1; Fig. 3, a plan view of the other part; Fig. 4, a section on the line 4 4 of Fig. 3, and Fig. 5 a section on the line 5 5 of Fig. 3.

In the drawings forming part of this specification the separate parts of my improvement are designated by the same reference-numerals throughout the several views, and in the practice of my invention I provide a device for extracting the juice of lemons and other fruit, which comprises two parts 5 and 6, which are hinged together by means of a link or links 7. The part 5 consists of a block 8, which is provided with a handle 9, and the central lower portion of which is provided with a circular or convex projection 10, around which is placed longitudinally of the block 8 a blade 11, which is semicircular in form. The other part 6 is also composed of a block 12, which is provided at one side with transverse notches or recesses 13, through which the links 7 pass, and the block 8 of the upper part is provided with semicircular notches or recesses, and said parts are connected by rods 14, which pass through said links and through the ends of the blocks.

The block 6 is provided centrally thereof with an elliptical opening 15, and the side thereof opposite its hinged connection with the block 8 is provided with a slot or opening 16, and mounted in the elliptical opening 15 is a cup-shaped receptacle 17, which is composed of metal and provided with an annular rim 18, and at one side thereof is formed a socket 19, into which projects a shank 20 of a handle 21, and said shank is secured in said socket by a bolt 22, which passes through the block 12 and through the shank 20 of the handle 21 and through the socket 19, which is formed on the cup-shaped receptacle 17, and the socket 19 of the receptacle 17 and the shank 20 of the handle 21 rest in and operate in the slot or opening 16 of the block 6. The cup-shaped receptacle 17 is also provided with a transverse slot 23, which is adapted to receive the blade 11, and the bottom of said receptacle is perforated, as shown at 24, and the operation will be readily understood from the foregoing description when taken in connection with the accompanying drawings and the following statement thereof.

In practice the lemon or other fruit from which the juice is to be extracted, or one-half thereof, is placed in the receptacle 17, and the device is grasped by the handles 9 and 21 and the separate parts thereof are brought together, and the lemon is again divided by the blade 11, and the convex lower portion of the block 8 forces the lemon into the cup or receptacle 17, and the juice thereof is extracted and passed through the perforations 24 in the bottom thereof.

By raising the upper part of the block 8 by means of the handle 9 the handle 21 of the lower part of the block 12 may be swung downwardly and the cup-shaped receptacle 17 raised, as shown in dotted lines in Fig. 4, and this operation throws the lemon out of said receptacle.

The lemon need not necessarily be divided before being placed in the receptacle 17, as the blade 11 will, as will be understood, perform this operation when the separate parts are pressed together, but I prefer to first divide the lemon, as hereinbefore described.

My invention is not limited to the exact form of the various parts as herein shown and described, as it is evident that changes therein and modifications thereof may be made without departing from the spirit of my invention or sacrificing its advantages.

Having fully described my invention, I claim as new and desire to secure by Letters Patent—

1. The herein-described device for extracting the juice of lemons and other fruit, the same consisting of two similar parts or blocks which are hinged together at one side, and one of which is provided with a handle at its opposite side, said last-named part being also provided on its inner or lower surface with a convex portion to which is secured centrally thereof a circular blade, and the other or lower part being provided with an opening, in which is placed a cup-shaped receptacle to which is secured a handle which is pivoted in said part, the bottom of said receptacle being perforated and provided with a slot which is adapted to receive said blade, substantially as shown and described.

2. The herein-described device for extracting the juice of lemons and other fruit, the same consisting of two similar parts or blocks which are hinged together at one side, and one of which is provided with a handle at its opposite side, said last-named part being also provided on its inner or lower surface with a convex portion to which is secured centrally thereof, a circular blade, and the other or lower part being provided with an opening, in which is placed a cup-shaped receptacle, to which is secured a handle which is pivoted in said part, the bottom of said receptacle being perforated and provided with a slot which is adapted to receive said blade, said receptacle being secured to the pivoted handle and being adapted to be raised when the handle is depressed, substantially as shown and described.

3. The herein-described device for extracting the juice of lemons and other fruit, the same consisting of two similar parts or blocks which are pivotally connected or hinged together at their rear edges, one of said parts or blocks being provided with a handle at its opposite or front edge, and being also provided centrally of the inner or lower surface thereof, with a convex portion to which is secured or around which passes a circular blade, and the other part or block being provided with an opening, in which is pivoted a cup-shaped receptacle, said cup-shaped receptacle being provided with a handle which is pivoted in the slot or opening formed in the front edge of the block in which the opening is formed, and said receptacle being also perforated, and provided with a slot which is adapted to receive said blade, substantially as shown and described.

In testimony that I claim the foregoing as my invention I have signed my name, in presence of the subscribing witnesses, this 31st day of December, 1896.

LEOPOLD PHILIP STRAUBE.

Witnesses:
 WM. H. STRAUBE,
 MATHIAS SCHNEIDER.